(12) United States Patent
Dintenfass et al.

(10) Patent No.: US 12,143,375 B2
(45) Date of Patent: Nov. 12, 2024

(54) SYSTEMS AND METHODS FOR TRACKING, AUTHENTICATING, AND GENERATING RESOURCE DISTRIBUTIONS TO TRUSTED ENTITIES IN A NETWORK ENVIRONMENT

(71) Applicant: BANK OF AMERICA CORPORATION, Charlotte, NC (US)

(72) Inventors: Katherine Kei-Zen Dintenfass, Lincoln, RI (US); Sandra Ann Breece, Mooresville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 199 days.

(21) Appl. No.: 17/888,125

(22) Filed: Aug. 15, 2022

(65) Prior Publication Data
US 2024/0056432 A1 Feb. 15, 2024

(51) Int. Cl.
*H04L 9/40* (2022.01)
(52) U.S. Cl.
CPC ........ *H04L 63/062* (2013.01); *H04L 63/0853* (2013.01)
(58) Field of Classification Search
CPC .................. H04L 63/062; H04L 63/0853
USPC ........................................................ 726/4
See application file for complete search history.

(56) References Cited

U.S. PATENT DOCUMENTS

| 5,953,710 | A  | * | 9/1999  | Fleming ............... G06Q 20/405 235/380 |
|-----------|----|---|---------|---------------------------------------------|
| 6,920,558 | B2 |   | 7/2005  | Sames                                       |
| 7,200,869 | B1 |   | 4/2007  | Hacherl                                     |
| 7,383,433 | B2 |   | 6/2008  | Yeager                                      |
| 7,565,536 | B2 |   | 7/2009  | Vassilev                                    |
| 7,770,206 | B2 |   | 8/2010  | Dillaway                                    |
| 8,095,969 | B2 |   | 1/2012  | Dillaway                                    |
| 8,201,215 | B2 |   | 6/2012  | Dillaway                                    |
| 8,225,378 | B2 |   | 7/2012  | Dillaway                                    |
| 8,365,293 | B2 |   | 1/2013  | Brown                                       |
| 8,555,351 | B2 |   | 10/2013 | Readshaw                                    |
| 8,607,311 | B2 |   | 12/2013 | Becker                                      |
| 8,839,344 | B2 |   | 9/2014  | Becker                                      |
| 9,185,099 | B2 |   | 11/2015 | Brannon                                     |
| 9,392,021 | B1 |   | 7/2016  | Labana                                      |
| 10,445,739 | B1 | * | 10/2019 | Sahni .................... G06Q 20/405      |
| 11,797,975 | B1 | * | 10/2023 | Garlapati ........... G06Q 20/3274          |
| 2003/0233439 | A1 |   | 12/2003 | Stone                                     |

(Continued)

FOREIGN PATENT DOCUMENTS

EP 2550765 B1 1/2019

*Primary Examiner* — David P Zarka
(74) *Attorney, Agent, or Firm* — Moore & Van Allen PLLC; Lauren M. Stokes

(57) ABSTRACT

The present invention is configured to track a resource input distribution to a first user account; receive a third party distribution request from the first user account, the third party distribution request comprising at least a portion of the resource input distribution; and authenticate a third party associated with the third party distribution request, the authentication of the third party comprising a comparison of the third party against a trusted third party distribution set, wherein, in an instance where the third party matches at least one trusted third party of the trusted third party distribution set, allow a third party distribution associated with the third party distribution request.

18 Claims, 8 Drawing Sheets

(56) References Cited

U.S. PATENT DOCUMENTS

| | | | |
|---|---|---|---|
| 2008/0066147 A1 | 3/2008 | Dillaway | |
| 2011/0099361 A1 | 4/2011 | Shah | |
| 2011/0179477 A1 | 7/2011 | Starnes | |
| 2012/0197794 A1* | 8/2012 | Grigg | G06Q 20/40 |
| | | | 705/41 |
| 2015/0142595 A1* | 5/2015 | Acuna-Rohter | G06Q 20/40 |
| | | | 705/21 |
| 2015/0186886 A1* | 7/2015 | Schwalb | G06Q 20/405 |
| | | | 705/44 |
| 2016/0171503 A1* | 6/2016 | Nelsen | G06Q 20/42 |
| | | | 705/40 |
| 2016/0321663 A1* | 11/2016 | Batlle | G06Q 20/405 |
| 2016/0371699 A1* | 12/2016 | Proctor | G06Q 20/2295 |
| 2017/0032351 A1* | 2/2017 | Burroughs, Jr. | G06Q 20/326 |
| 2017/0221058 A1* | 8/2017 | Choudhary | G06Q 20/3255 |
| 2018/0046994 A1* | 2/2018 | Maenpaa | G06Q 20/2295 |
| 2020/0134622 A1* | 4/2020 | Panchomarthi | G06Q 20/2295 |
| 2022/0180344 A1* | 6/2022 | Fenichel | G06Q 20/3221 |
| 2023/0105089 A1* | 4/2023 | Lee | G06Q 20/405 |
| | | | 705/44 |
| 2023/0385813 A1* | 11/2023 | Fenichel | G06Q 20/2295 |

* cited by examiner

SYSTEMS AND METHODS FOR TRACKING, AUTHENTICATING, AND GENERATING RESOURCE DISTRIBUTIONS TO TRUSTED ENTITIES IN A NETWORK ENVIRONMENT

FIELD OF THE INVENTION

The present invention embraces a system for tracking, authenticating, and generating resource distributions to trusted entities in a network environment.

BACKGROUND

Users, including those users that may not have the ability to transmit resource distributions to third parties due to their inability to control their own accounts such as where the user is a minor, where the user has a mental or physical disability, and/or the like, who may wish to autonomously transmit their own resource distributions. However, and based on this inability to control their own accounts, users may be unable to transmit resource distributions without undue delay and hardship. For instance, a guardian of a user may have to step in for each resource distribution and separately approve each resource transaction. This kind of separate authorization for each resource distribution leads to higher processing power used between different user devices over a network, longer processing times between the submission of a third party distribution request which may be submitted by a first user (e.g., the first user that does not have the ability to control their own account) and the actual distribution of the resources to an authenticated third party, longer processing times due to more steps taken for each resource distribution, and longer delays in requiring the manual input by each user account in order to authenticate a third party for the resource distribution. Thus, there exists a need for tracking, authenticating, and generating resource distributions to trusted entities without unduly burdening computing systems, users of various user accounts, and/or without unduly delaying resource distributions by such burdens on computing systems and/or user accounts.

Further, there also exists a problem of determining an expected resource input distribution to the first user, based on expected withholdings and other such allocations that may not be readily apparent based on the actual resource input distribution received to the user account. Indeed, there exists a need to quickly and efficiently determine where each resource of the resource input distribution was allocated to and why before the resource input distribution was transmitted.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for tracking, authenticating, and generating resource distribution to trusted third parties is provided. The system may comprise: a memory device, at least one processing device operatively coupled to the at least one memory device operatively coupled to the at least one memory device and the at least one communication device, wherein executing the computer-readable code is configured to cause the at least one processing device to: track a resource input distribution to a first user account; receive a third party distribution request from the first user account, the third party distribution request comprising at least a portion of the resource input distribution; and authenticate a third party associated with the third party distribution request, the authentication of the third party comprising a comparison of the third party against a trusted third party distribution set, wherein, in an instance where the third party matches at least one trusted third party of the trusted third party distribution set, allow a third party distribution associated with the third party distribution request.

In some embodiments, the processing device may further be configured to: authenticate a third party associated with the third party distribution request, the authentication of the third party comprising a comparison of the third party against a trusted third party distribution set, wherein, in an instance where the third party does not match at least one third party of the trusted third party distribution set, deny the third party distribution associated with the third party distribution request.

In some embodiments, the trusted third party distribution set is determined by a second user associated with a second user account, the second user account comprising a plurality or privilege identifiers, wherein the plurality of privilege identifiers comprises an a first user account identifier. In some embodiments, the plurality of privilege identifiers comprises an allowance of the second user account to identify a plurality of trusted third parties associated with the trusted third party distribution set.

In some embodiments, the processing device is further configured to: identify a plurality of categories for the trusted third party distribution set, the plurality of categories comprising at least one of a type of entity, a type of entity function, or a type of geolocation; generate a potential third party distribution set, the potential third party distribution set comprising a plurality of potential third parties; transmit the potential third party distribution set to a second user account; receive a plurality of accepted third parties from the second user account; and update the trusted third party distribution set with the plurality of accepted third parties.

In some embodiments, the processing device is further configured to: receive an indication of the resource input distribution to the first user account; determine, in response to receiving the indication of the resource input distribution, a trusted third party distribution from the trusted third party distribution set; and automatically distribute the trusted third party distribution to a trusted third party associated with the trusted third party distribution. In some embodiments, the third party distribution comprises a pre-determined portion of the resource input distribution.

In some embodiments, the processing device is further configured to generate a third party distribution interface component to configure a graphical user interface of a device associated with the first user account, the third party distribution interface component comprising data of the third party distribution. In some embodiments, the processing device is further configured to generate a graphic third party distribution interface component to configure the graphical user interface of the device associated with the first user account, the graphic third party distribution interface component comprising at least one of data associated with the third party of the third party distribution, a function of the third party distribution, or an illustrative function of the third party distribution.

In some embodiments, the tracking of the resource input distribution comprises the processing device being further configured to: receive a plurality of first user account indicators, the plurality of first user account indicators comprising at least one of an expected resource input distribution or a plurality of expected resource allocations to a plurality of associations; generate an expected input resource performance based on the plurality of first account indicators; and generate an expected input resource performance interface component to configure a graphical user interface of the device associated with the first user account, the expected input resource performance interface component comprising the expected input resource performance.

In another aspect, a computer-program product for tracking, authenticating, and generating resource distributions to trusted third parties is provided. The computer program product may comprise at least one non-transitory computer-readable medium having computer-readable program code portions embodied therein, the computer-readable program code portions which when executed by a processing device are configured to cause the processor to: track a resource input distribution to a first user account; receive a third party distribution request from the first user account, the third party distribution request comprising at least a portion of the resource input distribution; authenticate a third party associated with the third party distribution request, the authentication of the third party comprising a comparison of the third party against a trusted third party distribution set, wherein, in an instance where the third party matches at least one trusted third party of the trusted third party distribution set, allow a third party distribution associated with the third party distribution request; and automatically update a third party distribution tracking database associated with the first user account with a third party distribution request.

In some embodiments, the processing device is further configured to cause the processor to: authenticate a third party associated with the third party distribution request, the authentication of the third party comprising a comparison of the third party against a trusted third party distribution set, wherein, in an instance where the third party does not match at least one third party of the trusted third party distribution set, deny the third party distribution associated with the third party distribution request.

In some embodiments, the trusted third party distribution set is determined by a second user associated with a second user account, the second user account comprising a plurality or privilege identifiers, wherein the plurality of privilege identifiers comprises a first user account identifier. In some embodiments, the plurality of privilege identifiers comprises an allowance of the second user account to identify a plurality of trusted third parties associated with the trusted third party distribution set.

In some embodiments, the processing device may further be configured to cause the processor to: identify a plurality of categories for the trusted third party distribution set, the plurality of categories comprising at least one of type of entity, a type of entity function, or a type of geolocation; generate a potential third party distribution set, the potential third party distribution set comprising a plurality of potential third parties; transmit the potential third party distribution set to a second user account; receive a plurality of accepted third parties from the second user account; and update the trusted third party distribution set with the plurality of accepted third parties.

In some embodiments, the processing device may further be configured to cause the processor to: receive an indication of the resource input distribution to the first user account; determine, in response to receiving the indication of the resource input distribution, a trusted third party distribution from the trusted third party distribution set; and automatically distribute the trusted third party distribution to a trusted third party associated with the trusted third party distribution. In some embodiments, the third party distribution comprises a pre-determined portion of the resource input distribution.

In some embodiments, the processing device may further be configured to cause the processor to generate a third party distribution interface component to configure a graphical user interface of a device associated with the first user account, the third party distribution interface component comprising data of the third party distribution.

In some embodiments, the tracking of the resource input distribution comprises the processing device being further configured cause the processor to: receiving a plurality of first user account indicators, the plurality of first user account indicators comprising at least one of an expected resource input distribution or a plurality of expected resource allocations to a plurality of associations; generate an expected input resource performance based on the plurality of first account indicators; and generate an expected input resource performance interface component to configure a graphical user interface of the device associated with the first user account, the expected input resource performance interface component comprising the expected input resource performance.

In another aspect, a computer-implemented method for tracking, authenticating, and generating resource distributions to trusted third parties is provided. The computer-implemented method may comprise: tracking a resource input distribution to a first user account; receiving a third party distribution request from the first user account, the third party distribution request comprising at least a portion of the resource input distribution; authenticating a third party associated with the third party distribution request, the authentication of the third party comprising a comparison of the third party against a trusted third party distribution set, wherein, in an instance where the third party matches at least one trusted third party of the trusted third party distribution set, allowing a third party distribution associated with the third party distribution request; and automatically updating a third party distribution tracking database associated with the first user account with a third party distribution request.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
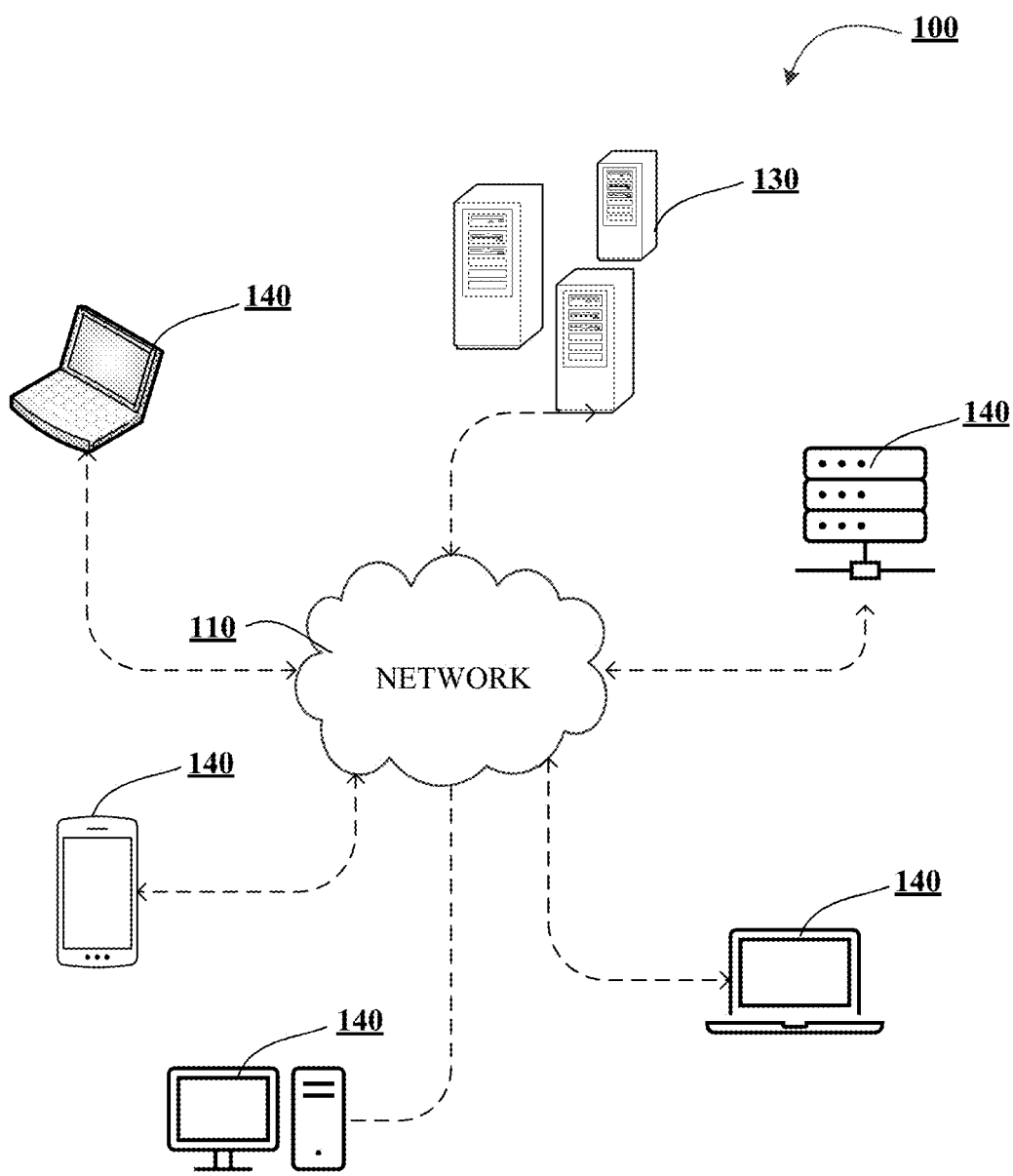
Figure 1B:
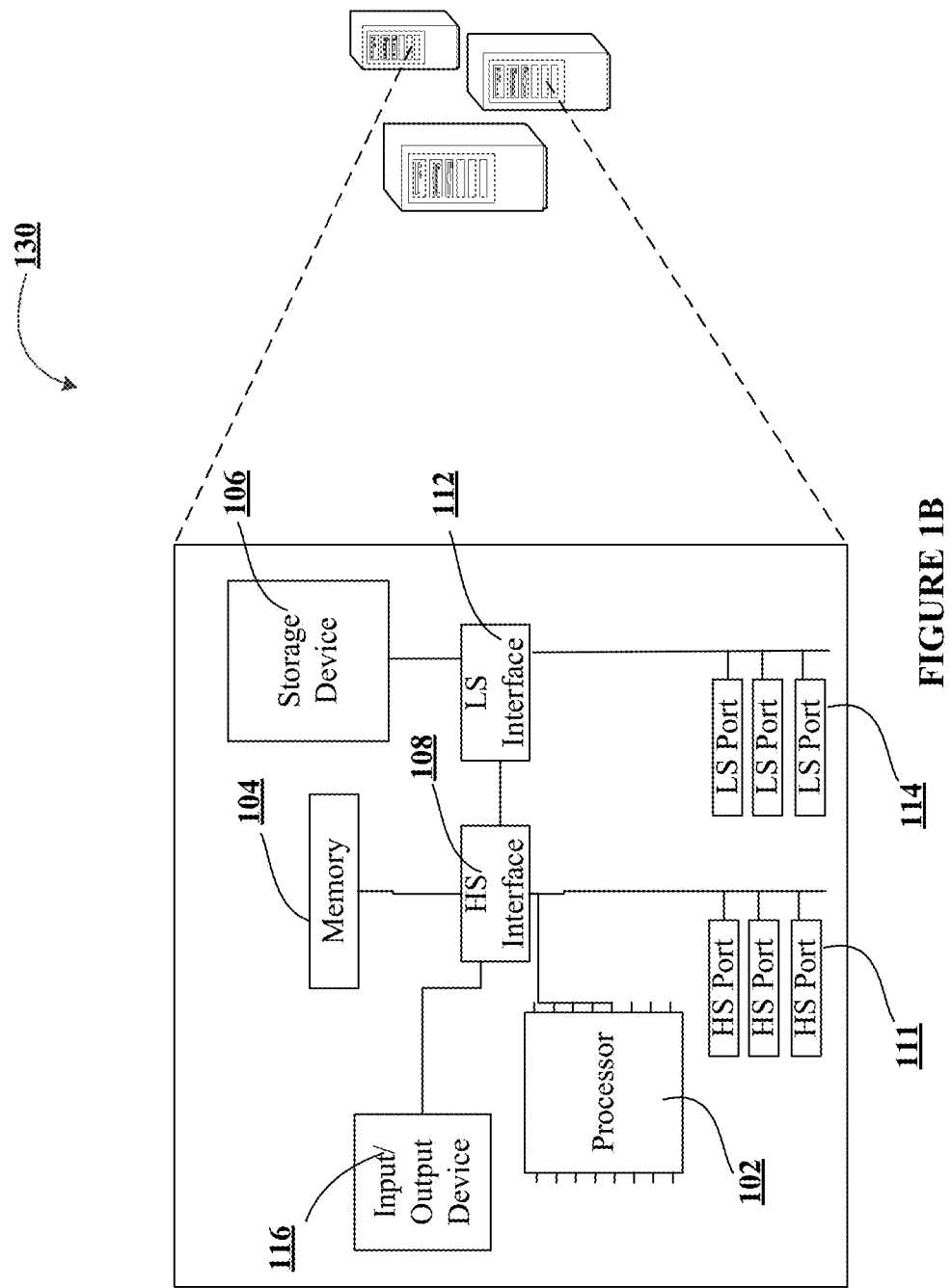
Figure 1C:
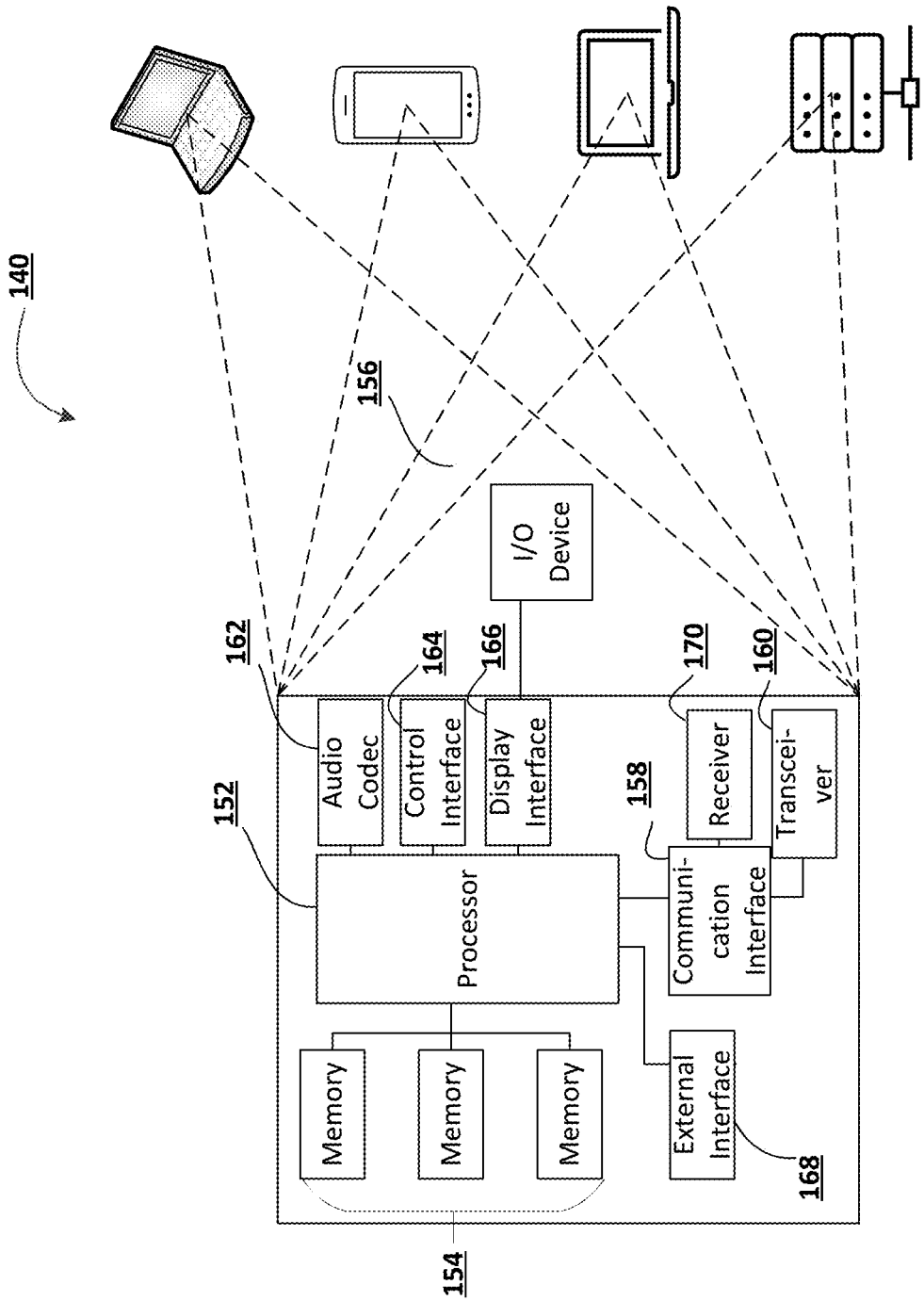
Figure 2:
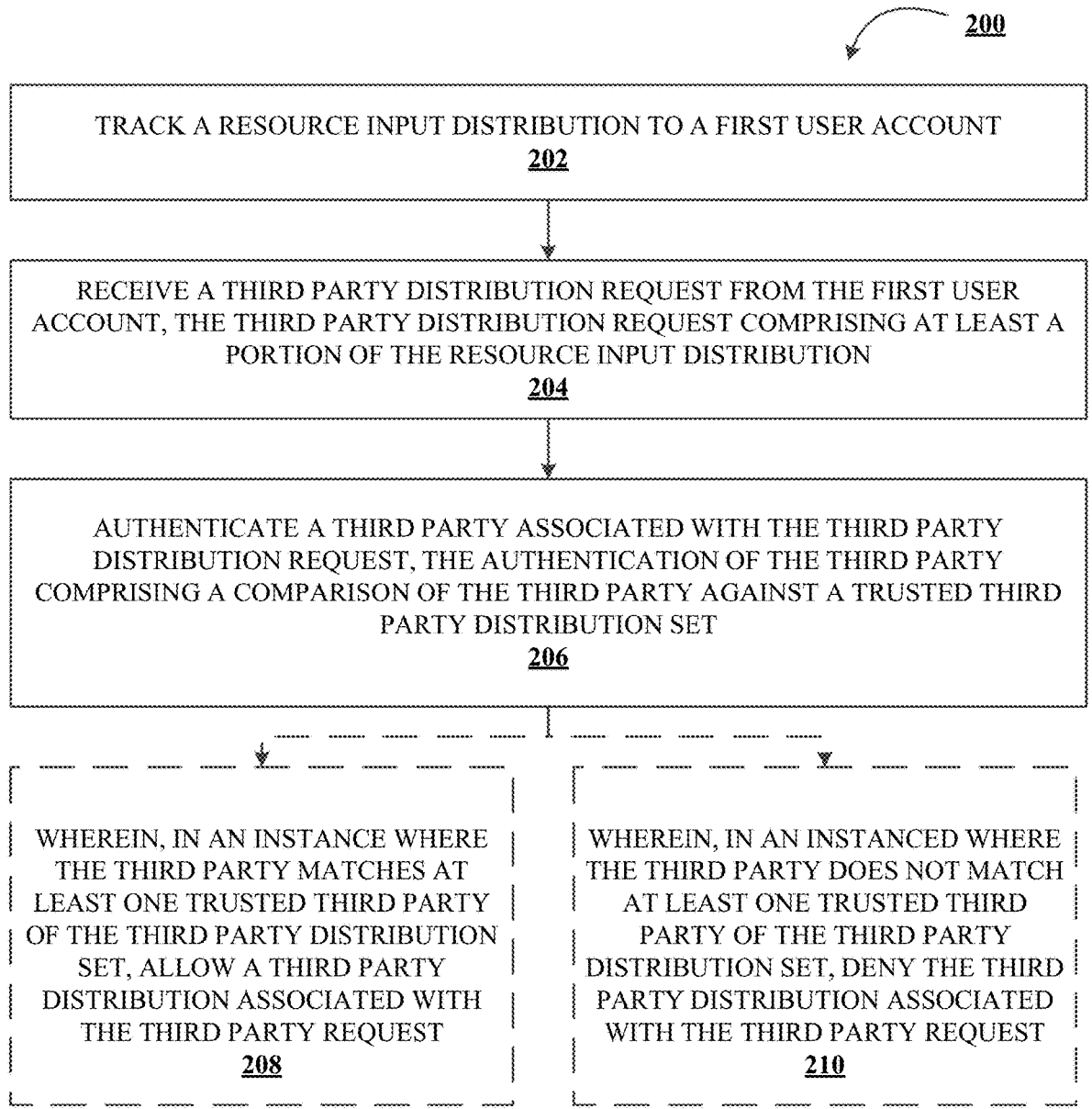
Figure 3:
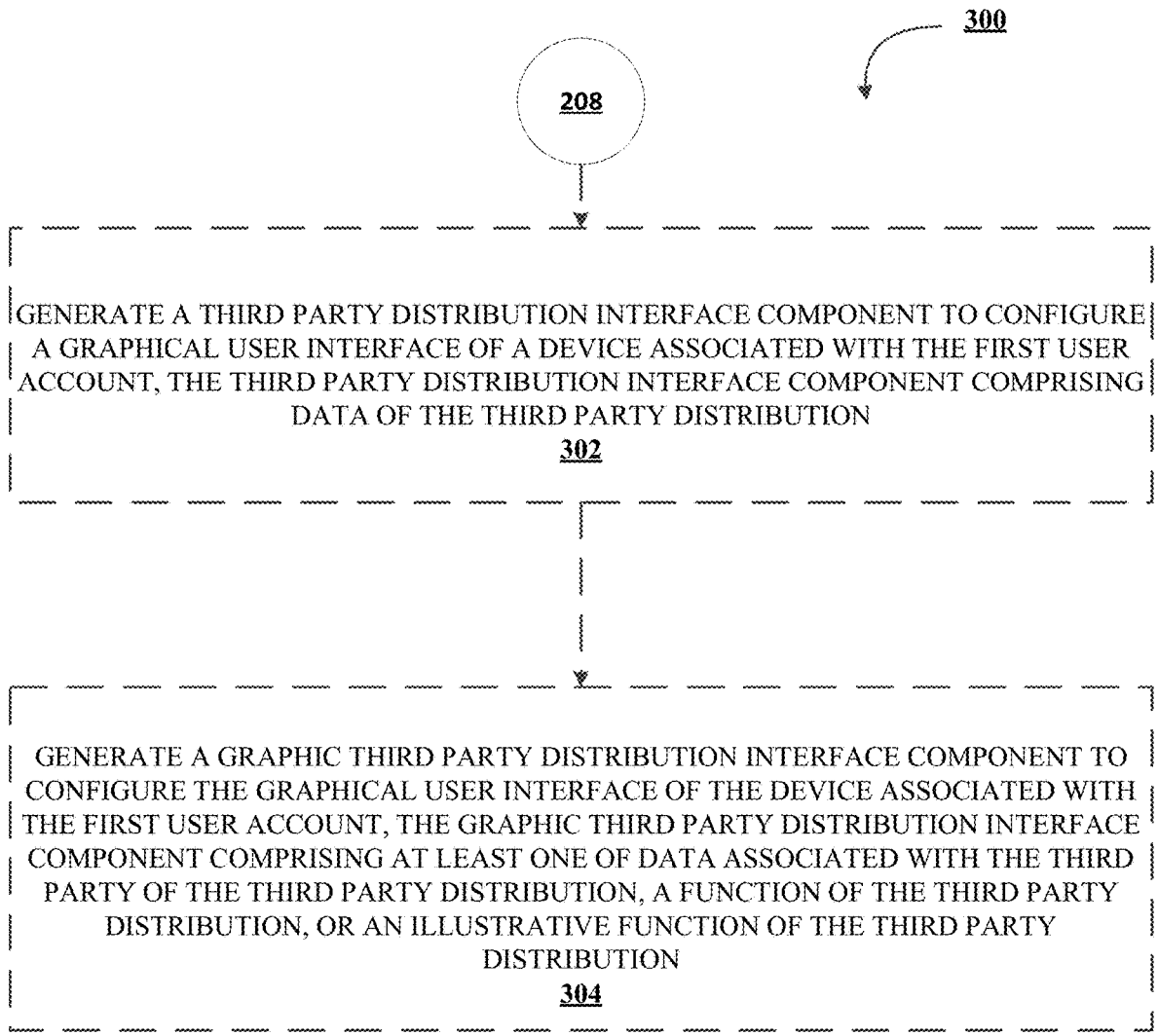
Figure 4:
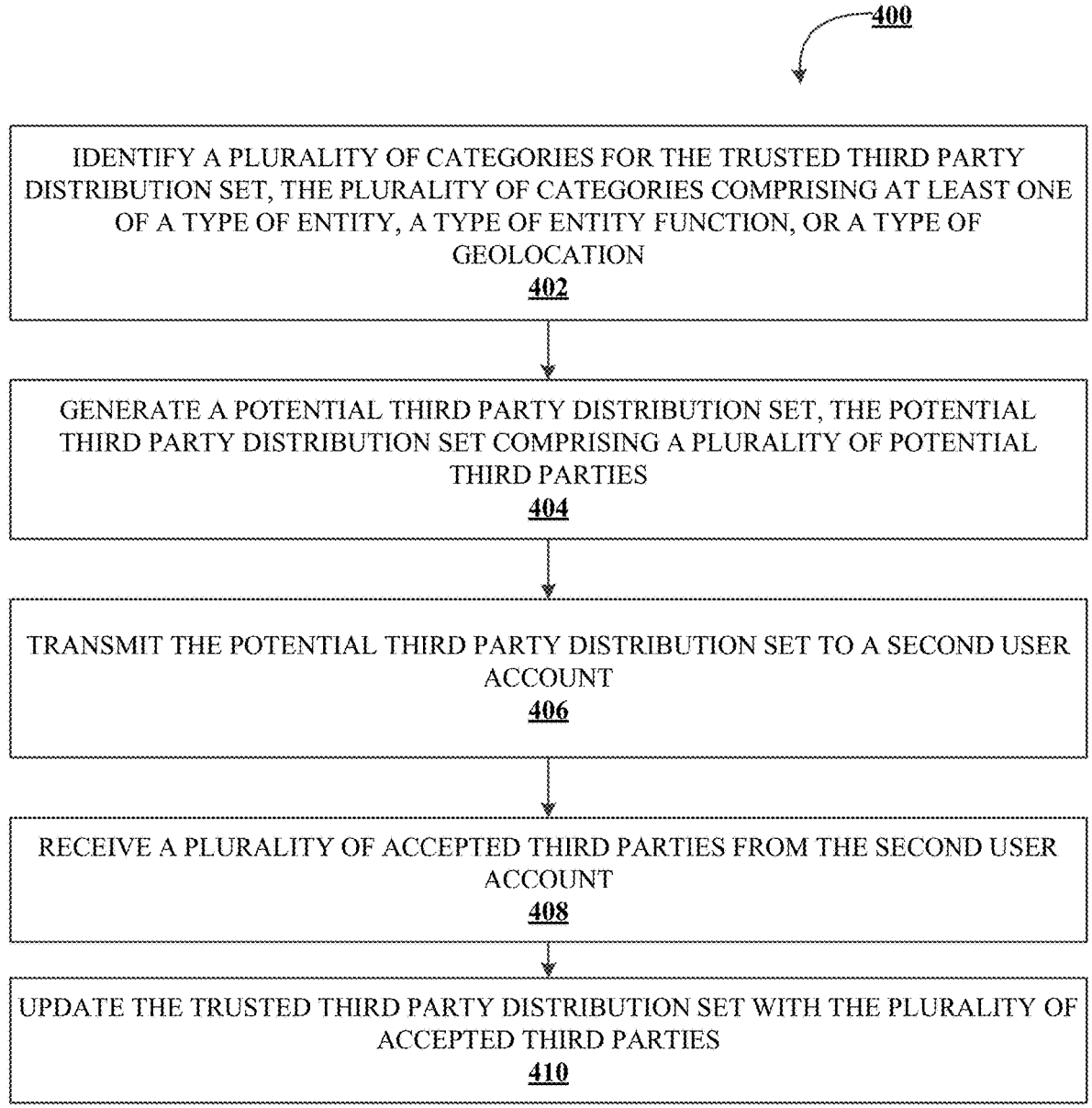
Figure 5:
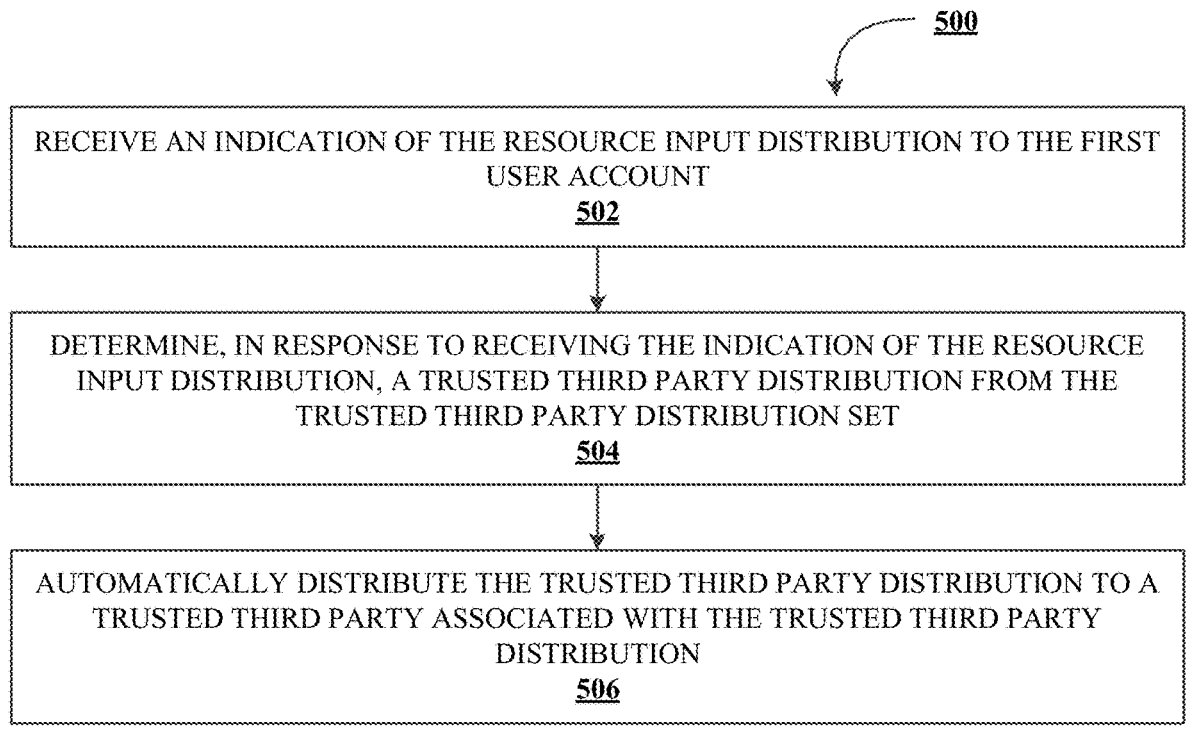
Figure 6:
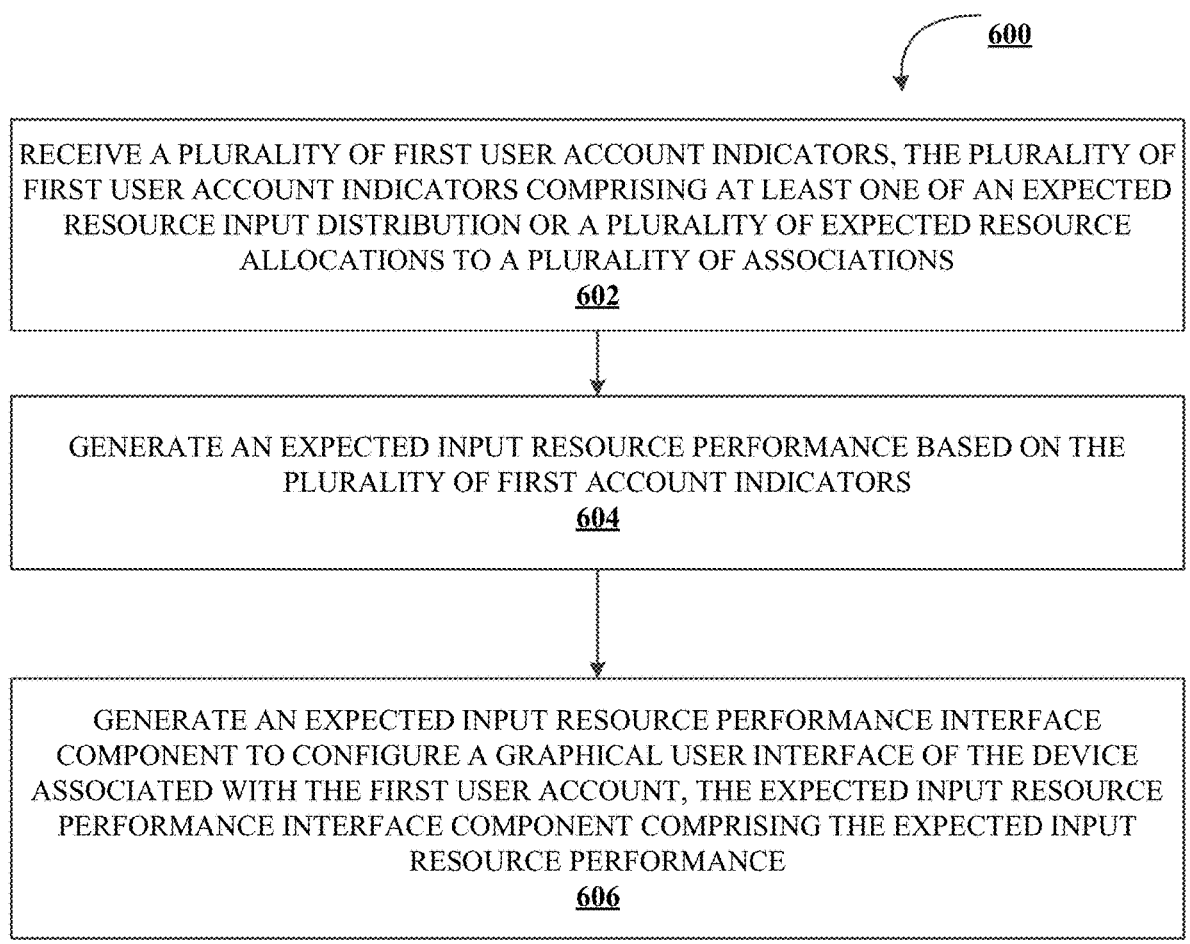

Having thus described embodiments of the invention in general terms, reference will now be made the accompanying drawings, wherein:

FIGS. 1A-1C illustrates technical components of an exemplary distributed computing environment for tracking, authenticating, and generating resource distributions to trusted entities in a network environment, in accordance with an embodiment of the invention;

FIG. 2 illustrates a process flow for tracking, authenticating, and generating resource distributions to trusted entities in a network environment, in accordance with an embodiment of the invention;

FIG. 3 illustrates a process flow for generating a third party distribution interface component and a graphic third party distribution interface component to configure a graphical user interface of a user device, in accordance with an embodiment of the invention;

FIG. 4 illustrates a process flow for updating a trusted third party distribution set by a second user account, in accordance with an embodiment of the invention;

FIG. 5 illustrates a process flow for automatically distributing the trusted third party distribution to a trusted third party associated with the trusted third party distribution set, in accordance with an embodiment of the invention; and FIG. 6 illustrates a process flow for generating an expected input resource performance interface component to configure a graphical user interface of a user device, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As described in further detail herein, the present invention provides a solution to the above-referenced problems in the field of technology by tracking, authenticating, and generating resource distributions to trusted third parties in an accurate, secure, and efficient process. The present invention solves these technical problems by implementing a resource distribution authentication system, like that shown as system 130 of FIGS. 1A-1C. For instance, the resource distribution authentication system acts to track each resource distribution, including a resource input distribution received to a first user account and/or a third party distribution transmitted from the first user account to a trusted third party; authenticate each distribution and the receiving party (e.g., the trusted third party), and generate the each resource distribution (e.g., the third party distribution and/or trusted third party distribution) without (1) unduly burdening computing systems or users of each account disclosed herein, and (2) unduly delaying the resource distributions by the burdens on computing systems or users of each account. Thus, the resource distribution authentication system at least acts to verify the third parties for which the resource distribution from the first user account is intended to transmit, such that resource distributions are not transmitted to the wrong third parties or unapproved third parties.

Accordingly, the present invention resource distribution authentication system for tracking a resource input distribution (e.g., such as a direct deposit) to a first user's account, such as a child's or minor's bank account and then receiving a third party distribution request from the same first user account which requests a resource distribution request for a third party, such as a charity or other organization. The resource distribution authentication system further provides for authenticating the third party associated with the third party distribution request against a pre-set or pre-determined trusted third party distribution set which includes a plurality of trusted third parties that have been pre-verified by a second user account (e.g., a parent or guardian to the first user account). In the case where the third party associated with the third party distribution request matches at least one trusted third party in the trusted third party distribution set, the resource distribution authentication system will allow the resource distribution (e.g., third party distribution). The resource distribution authentication system may also generate a plurality of other potential third parties to present to the second user account for an update to the trusted third party distribution set by categorizing the trusted third parties already in the trusted third party distribution set and generating a list of other third parties that are in similar or the same categories (e.g., potential third parties). The system may further authenticate the received input distribution that the first user account received against an expected resource input distribution in order to indicate to the first user whether the correct received input distribution was transmitted from a source entity (e.g., such as an employer of the first user).

What is more, the present invention provides a technical solution to a technical problem. As described herein, the technical problem includes the tracking, authentication, and generation of resource distributions in a network environment while not (1) unduly burdening computer resources and users associated with user accounts for each resource distribution and (2) unduly delaying the resource distributions. The technical solution presented herein allows for tracking a resource input distribution to a first user account, receiving a third party distribution request from the first user account, authenticating the third party associated with the third party distribution request based on a trusted third party distribution set, and allowing the third party distribution where the third party identifier of the third party distribution requests matches a trusted third party identifier that is already stored in a trusted third party distribution set. In particular, the resource distribution authentication system is an improvement over existing solutions by lessening the computer-processing burden and delay in allowing resource distributions, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for tracking, authenticating, and generating resource distributions to trusted entities in a network environment 100, in accordance with an embodiment of the invention. As shown in FIG. 1A, the distributed computing environment 100 contemplated herein may include a system 130 (i.e., an authentication credential verification), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for tracking, authenticating, and generating resource distributions to trusted entities in a network environment, in accordance with an embodiment of the invention. In some embodiments, a system (e.g., similar to one or more of the systems described herein with respect to FIGS. 1A-1C) may perform one or more of the steps of process flow 200. For example, a resource distribution authentication system (e.g., the system 130 described herein with respect to FIG. 1A-1C) may perform the steps of process 200.

As shown in block 202, the process flow 200 may include the step of tracking a resource input distribution to a first user account. By way of non-limiting example, the resource input distribution may refer to a resource distribution from an external account (e.g., a source account) to the first user account. In some embodiments, and by way of non-limiting example, the resource input distribution may comprise a resource distribution such as a distribution of money, possessions, and/or the like from an external account (e.g., a business, entity, individual, and/or the like) that may have an obligation to distribute the resource(s) to the first user account (e.g., a business and/or entity that may pay the first user account as a payment of services rendered to the business and/or entity).

In some embodiments, the tracking of the resource input distribution to the first user account may comprise an indication that is transmitted from the first user account to the resource distribution authentication system, wherein the indication may comprise data regarding the resource input distribution. In some embodiments, such data regarding the resource input distribution may comprise at least one of the account identifier(s) associated with the resource input distribution (e.g., the first user account identifier and/or the account identifier for the source of the resource input distribution—the external account), the amount of the resource input distribution (e.g., where the resource input distribution is quantifiable, such as money), a timestamp of the resource input distribution, and/or the like.

In some embodiments, the tracking of the resource distribution may be done internally within the resource distribution authentication system, such as where an account associated with the resource input distribution (e.g., the first user account) is stored and accessed within the resource distribution authentication system. For instance, a plurality of user accounts (e.g., the first user account, the second user account, and/or the like) may be stored in a plurality of memories, such as memory 154, memory 104, and/or the like within the resource distribution authentication system as shown in FIGS. 1A-1C. The tracking of the resource input distribution to an account is described in further details with respect to FIG. 6.

As shown in block 204, the process flow 200 may include the step of receiving a third party distribution request from the first user account, the third party distribution request comprising at least a portion of the resource input distribution. By way of non-limiting example, the resource distribution authentication system may receive a third party distribution request from a user account, such as the first user account, which may indicate a resource distribution that the user account wishes to transmit to a third party account. For instance, the third party distribution request may comprise data regarding the third party account (i.e., a third party account identifier that uniquely identifies the third party account for which the resource distribution from the first user account is intended to be transmitted), data regarding an amount for the resource distribution, and/or an intended timestamp of the intended third party distribution (e.g., an intended time for the distribution to be transmitted from the first user account).

In some embodiments, the third party distribution request may comprise an amount that is a portion of the resource input distribution (e.g., such as a percentage of the resource input distribution). In some embodiments, the third party distribution request may comprise an amount that is the full amount of the resource input distribution. In some embodiments, the third party distribution request may comprise a pre-set percentage of the resource input distribution, which may be pre-set by the first user account and/or by the second user account.

As shown in block 206, the process flow 200 may include the step of authenticating a third party associated with the third party distribution request, the authentication of the third party comprising a comparison of the third party against a trusted third party distribution set. By way of non-limiting example, the resource distribution authentication system may authenticate the third party associated with the third party request before the third party distribution may take place. Such an authentication may comprise the comparison of a third party identifier of the third party distribution request being compared to a plurality of trusted third party identifiers comprised within a trusted third party distribution set.

In some embodiments, the trusted third party distribution set may be determined by a second user associated with a second user account. By way of non-limiting example, the second user account may be associated with the first user account, such as an entity that may exercise some control over the first user account. For instance, a second user of the second user account may be a parent of a child, where the child is associated with the first user account; a guardian of a child, where the child is associated with the first user account; an adult under the guardianship of a person associated with the second user account, where the adult under the guardianship is associated with the first user account (e.g., an adult with mental and/or physical disabilities); and/or the like.

By way of non-limiting example, the second user account may comprise a plurality of privilege identifiers associated with account identifiers for which the second user account has access privileges to a plurality of accounts, including the first user account. For instance, the plurality of privilege identifiers may be used by the resource distribution authentication system to indicate which accounts a second user account may have access and/or privileges to, such as a privilege to distribute resources from the first user account to a different user account without requiring verification from the first user of the first user account. In some embodiments, the plurality of privilege identifiers may comprise a plurality of account identifiers (e.g., which may comprise a first user account identifier) that the second user account may have access too, where the plurality of account identifiers of the privilege identifiers may indicate to the resource distribution authentication system which accounts the second user account has privilege to access and/or control.

In some embodiments, the plurality of privilege identifiers may further comprise a plurality of account identifiers associated with a plurality of trusted third parties for which the first user account may distribute resources to.

In some embodiments, and as shown in block 208, the process flow 200 may include the step of allowing, in the instance where the third party matches at least one trusted third party of the third party distribution set, a third party distribution associated with the third party request. By way of non-limiting example, the resource distribution authentication system may compare the third party identifier associated with the third party distribution request to a plurality of trusted third party identifiers, and where the resource distribution authentication system has determined a match within the trusted third party distribution set, the resource distribution authentication system may allow the third party distribution from the first user account to the third party associated with the third party distribution request. In some embodiments, the third party distribution may be automatic and immediate once the third party identifier has been determined to be a match to a trusted third party identifier. In some embodiments, the third party distribution may be automatic and at a specific time associated with a timestamp comprised within the third party distribution request (e.g., a specific future time).

In some embodiments, and as shown in block 210, the process flow 400 may include the step of denying, in the instance where the third party does not match at least one trusted third party of the third party distribution set, the third party distribution associated with the third party request. By way of non-limiting example, the resource distribution authentication system may determine that the third party identifier associated with the third party distribution request does not match any of the trusted third party identifiers in the trusted third party distribution set, and, thus, may deny the third party distribution. Such a denial may be automatic. In some embodiments, the resource distribution authentication system may configure a graphical user interface of a user device associated with the first user account to request another third party distribution request which may identify a different third party for the third party distribution.

FIG. 3 illustrates a process flow 300 for generating a third party distribution interface component and a graphic third party distribution interface component to configure a graphical user interface of a user device, in accordance with an embodiment of the invention. In some embodiments, a system (e.g., similar to one or more of the systems described herein with respect to FIGS. 1A-1C) may perform one or more of the steps of process flow 300. For example, a resource distribution authentication system (e.g., the system 130 described herein with respect to FIG. 1A-1C) may perform the steps of process 300.

In some embodiments, and as shown in block 302, the process flow 300 may include the step of generating a third party distribution interface component to configure a graphical user interface of a device associated with the first user account, the third party distribution interface component comprising data of the third party distribution. By way of non-limiting example, the resource distribution authentication system may generate a third party distribution interface component to indicate to a first user of the first user account the third party distribution. For instance, the third party distribution interface component may be transmitted from the resource distribution authentication system to a user device associated with the first user account to configure the graphical user interface of the user device. Such a third party distribution interface component may indicate to the first user that the third party distribution has occurred and/or is about to occur, such as at a specified time based on the timestamp of the third party distribution request, in some embodiments.

In some embodiments, the third party distribution interface component may comprise data regarding the third party distribution, such as data regarding the third party that the third party distribution is being transmitted to and/or other data such as that described with respect to block 304 (e.g., the graphic third party distribution interface component and its associated data).

In some embodiments, the third party distribution interface component may configure the graphical user interface of the user device to show that the third party distribution will not occur due to the third party identifier of the third party distribution request not matching a trusted third party identifier.

In some embodiments, and as shown in block 304, the process flow 300 may include the step of generating a graphic third party distribution interface component to configure the graphical user interface of the device associated with the first user account, the graphic third party distribution interface component comprising at least one of data associated with the third party of the third party distribution, a function of the third party distribution, or an illustrative function of the third party distribution. By way of non-limiting example, the resource distribution authentication system may generate and transmit a graphic third party distribution interface component to a user device associated with the first user account in order to configure the graphical user interface of the user device.

By way of non-limiting example, the function of the third party may comprise data regarding the function of each third party and what the third party distribution may be used for. For instance, and where the third party of the third party distribution is categorized as a charitable organization, and specifically as an animal organization such as an animal shelter, the function of the third party may indicate that the third party may use the third party distribution to feed a plurality of puppies, kittens, dogs, cats, and/or the like. In some embodiments, and by way of non-limiting example, where the third party of the third party distribution is a charitable organization, and specifically an environmental organization, the function of the third party may indicate that the third party distribution is used for cleaning up trash along a specific waterway. In this manner, the function of the third party may refer to a specific function or activity that the third party distribution is being used for.

By way of non-limiting example, an illustrative function of the third party distribution may comprise a visual and/or graphic of the function of the third party. For instance, and in the example where the function of the third party comprises feeding puppies at an animal shelter, the illustrative function of the third party may comprise a graphic showing the feeding of puppies at the animal shelter. Thus, each of these third party data sets (e.g., a function of the third party distribution and/or an illustrative function of the third party distribution) may be used by the resource distribution authentication system to generate the graphic third party distribution interface component to indicate to a first user exactly what each third party distribution is being used for.

FIG. 4 illustrates a process flow 400 for updating a trusted third party distribution set by a second user account, in accordance with an embodiment of the invention. In some embodiments, a system (e.g., similar to one or more of the systems described herein with respect to FIGS. 1A-1C) may perform one or more of the steps of process flow 400. For example, a resource distribution authentication system (e.g., the system 130 described herein with respect to FIG. 1A-1C) may perform the steps of process 400.

As shown in block 402, the process flow 400 may include the step of identifying a plurality of categories for the trusted third party distribution set, the plurality of categories comprising at least one of a type of entity, a type of entity function, or a type of geolocation. By way of non-limiting example, the resource distribution authentication system may identify a plurality of categories for the trusted third party distribution set, where the plurality of categories may be used to categorize each of the trusted third parties within the third party distribution set. Such categories may comprise at least one of a type of entity, a type of entity function, or a type of geolocation. By way of non-limiting example, the resource distribution authentication system may use each of these categories to categorize each of the third parties within the resource distribution authentication system, which may include both already-verified trusted third parties and/or third parties that have not yet been verified.

By way of non-limiting example, the category for the type of entity for the third parties (e.g., trusted third party, a third party not yet verified by a second user account, and/or third party of the third party distribution request) may comprise data showing the third party is at least one of a type of organization, such as a charity, an LLC, a corporation, a partnership, a single party entity such as an individual, a separate account associated with the first user account, and/or the like.

By way of non-limiting example, the category for the type of entity function for the third parties (e.g., trusted third party, a third party not yet verified by a second user account, and/or third party of the third party distribution request) may comprise data showing the third party has a certain function, such as at least one of a health organization, an animal organization, a human services organization, an environmental organization, an arts organization, an education organization, a community development organization, a savings account, a spending account, an investment account, and/or the like.

By way of non-limiting example, the category for the type of geolocation of the third parties (e.g., e.g., trusted third party, a third party not yet verified by a second user account, and/or third party of the third party distribution request) may comprise data showing the third party is in a certain geolocation such as a specific geolocation, a specific address, a specific city/town, a specific state, a specific country, a specific distance from the first user account to a physical address of the third party, and/or the like. In some embodiments, and based on the geolocation of the third parties, the resource distribution authentication system may determine that only those third parties within a certain distance the first user account should distribute the third party distribution to.

In some embodiments, the graphic third party distribution interface component may further show such data regarding the third party as a graphic (e.g., emoji, illustration, and/or the like) to show the first user of the first user account the data in a human-readable manner.

As shown in block 404, the process flow 400 may include the step of generating a potential third party distribution set, the potential third party distribution set comprising a plurality of potential third parties. By way of non-limiting example, the resource distribution authentication system may generate a potential third party distribution set based on a matching and/or comparison of third parties that are not yet approved by a second account against the trusted third parties of the third party distribution set. For instance, the resource distribution authentication system may generate the potential third party distribution set by identifying the categories of the trusted third party distribution set, identifying the categories of the potential third party distribution set, and determining whether the third parties of the potential third party distribution set match the categories of the trusted third party distribution set (e.g., match at least one of the type of entity, the type of entity function, and/or the type of geolocation). For instance, where a potential third party of the potential third party distribution set comprises the same type of geolocation (e.g., a same city/town, a same distance to the first user, and/or the like) to a trusted third party of the trusted third party distribution set, the resource distribution authentication system may keep the potential third party identifier in the potential third party distribution set. In some embodiments, and for instance, where a potential third party of the potential third party distribution set comprises the same type of entity function and/or the same type of entity to a trusted third party, the resource distribution authentication system may keep the potential third party within the potential third party distribution set.

In some embodiments, the potential third party distribution set may comprise only exact matches of the potential third parties to the trusted third parties of the trusted third party distribution set, such as where the potential third parties comprise all the same categories as the trusted third parties (e.g., just one trusted third party) of the trusted third party distribution set. In some embodiments, the potential third party distribution set may comprise the potential third parties having only one category that matches at least one of the trusted third parties.

As shown in block 406, the process flow 400 may include the step of transmitting the potential third party distribution set to a second user account. By way of non-limiting example, the resource distribution authentication system may transmit the potential third party distribution set to the second user account by way of transmitting the potential third party distribution set over a network (e.g., network 110 of FIG. 1A) to a user device associated with the second user account. In some embodiments, the resource distribution authentication system may generate an interface component comprising the data regarding the potential third party distribution set to configure the graphical user interface of the user device associated with the second user account.

In some embodiments, the resource distribution authentication system may track the interactions of the second user with the user device as the second user analyzes the potential third party distribution set.

As shown in block 408, the process flow 400 may include the step of receiving a plurality of accepted third parties from the second user account. By way of non-limiting example, the resource distribution authentication system may receive data regarding the interactions by the second user account with the potential third party distribution set. Such interactions may comprise the second user indicating whether at least one of the potential third parties of the potential third party distribution set is accepted and/or approved by the second user for the first user account to send a third party distribution. Such an indication may comprise binary computer-readable indicators, such as 1-bit to indicate an approval and/or a 0-bit to indicate a denial of a potential third party.

As shown in block 410, the process flow 400 may include the step of updating the trusted third party distribution set with the plurality of accepted third parties. By way of non-limiting example, and upon receiving the plurality of accepted third parties from the second user account, the resource distribution authentication system may update the trusted third party distribution set to include the newly accepted third parties from the potential third party distribution set.

In some embodiments, the resource distribution authentication system may also update its own database with the potential third parties of the potential third party distribution set that were not accepted by the second user. For instance, the resource distribution authentication system may track and/or store this data regarding the rejected third parties of the potential third party distribution set and use this data to make sure that the rejected third parties are not submitted to the second user account again as a potential third party.

FIG. 5 illustrates a process flow 500 for automatically distributing the trusted third party distribution to a trusted third party associated with the trusted third party distribution set, in accordance with an embodiment of the invention. In some embodiments, a system (e.g., similar to one or more of the systems described herein with respect to FIGS. 1A-1C) may perform one or more of the steps of process flow 500. For example, a resource distribution authentication system (e.g., the system 130 described herein with respect to FIG. 1A-1C) may perform the steps of process flow 500.

As shown in block 502, the process flow 500 may include the step of receiving an indication of the resource input distribution to the first user account. By way of non-limiting example, the resource distribution authentication system may receive an indication regarding a resource input distribution to a first user account from a separate system controlling and/or storing the data of the first user account. In some embodiments, such a separate system may be controlled by an entity associated with resource distributions associated with the first user account (e.g., a financial institution of the first user account). In some embodiments, the resource distribution authentication system may receive an indication via a data transmission from the separate system associated with the first user account, the data transmission comprising the data regarding the resource input distribution (e.g., the amount of the resource input distribution, the source entity, and/or the like) which may be transmitted over a network, such as network 110 of FIG. 1A, to the resource distribution authentication system.

In some embodiments, the first user account, and its associated data including the received resource input distribution, may be stored within the resource distribution authentication system such that the resource distribution authentication system and the resource input distribution may be internally tracked.

As shown in block 504, the process flow 500 may include the step of determining, in response to receiving the indication of the resource input distribution, a trusted third party distribution from the trusted third party distribution set. By way of non-limiting example, the resource distribution authentication system may automatically—and without receiving a third party distribution request—determine a trusted third party to transmit a trusted third party distribution from the first user account. For instance, the resource distribution authentication system may use the trusted third party distribution set to select a trusted third party for the trusted third party distribution without intervention by either a first user account and/or a second user account.

In some embodiments, the trusted third party distribution from the first user account may be of a pre-selected and/or pre-determined amount of the resource input distribution (e.g., a specific percentage of the resource input distribution) which may have been previously selected by a first user account and/or a second user account. In some embodiments, and where the pre-selected amount of the resource input distribution is pre-determined by the first user account, the resource distribution authentication system may transmit the pre-selected amount to the second user account for authorization. Upon receiving the authorization, in some embodiments, the resource distribution authentication system may use this pre-selected amount for automatic trusted third party distributions until a new pre-selected amount for the trusted third party distributions is updated.

In some embodiments, the resource distribution authentication system may select the trusted third party from the trusted third party distribution set based on certain factors and/or categories that are typically part of the third party distribution request (e.g., categories which are often chosen by the first user account). For instance, the resource distribution authentication system may select the trusted third party from the trusted third party distribution set where the categories of the selected trusted third party matches a "favorite" (i.e., the most-selected third party of the third party distribution requests) third party.

In some embodiments, the resource distribution authentication system may randomly select a trusted third party from the trusted third party distribution set. Such a randomization of the trusted third parties may be based on a generation of random numbers for each of the trusted third parties and a selection of a single random number. Based on the selection of a single random number, the resource distribution authentication system may use the associated trusted third party of the single random number to transmit the trusted third party distribution.

In some embodiments, the resource distribution authentication system may use a "favorite" trusted third party (i.e., the highest selected trusted third party of the third party distribution requests) to transmit the trusted third party distribution.

In some embodiments, the resource distribution authentication system may use the previously-selected trusted third party from the previous iterations of the third party distribution requests, where the resource distribution authentication system may transmit the trusted third party distribution to the last-selected third party of the third party distribution. In this manner, the resource distribution authentication system may store each of the third party distributions in its memory (e.g., memory 104 and/or memory 154) for automatic selection of the trusted third party distribution.

As shown in block 506, the process flow 500 may include the step of automatically distributing the trusted third party distribution to a trusted third party associated with the trusted third party distribution. By way of non-limiting example, the resource distribution authentication system may automatically transmit and/or distribute the trusted third party distribution to the selected (e.g., resource distribution authentication system selected) trusted third party from the trusted third party distribution set.

In some embodiments, the trusted third party distribution may be transmitted automatically and immediately—or as close to immediately as possible (e.g., within a few milliseconds, a few seconds, a few minutes, and/or the like)—to the trusted third party once the indication of the resource input distribution is received.

In some embodiments, the resource distribution authentication system may transmit the trusted third party distribution at a pre-determined future time after receiving the indication of the resource input distribution. By way of non-limiting example, the pre-determined future time may be of a time that is pre-determined by either the first user account and/or the second user account (e.g., within an hour of receiving the indication of the resource input distribution, within two hours of receiving the indication of the resource input distribution, within five hours of receiving the indication of the resource input distribution, within twenty-four hours of receiving the indication of the resource input distribution, and/or the like). In this manner, and in some embodiments, the resource distribution authentication system may transmit an indication to the user device associated with the first user account and/or the second user account to indicate that the trusted third party distribution will occur in the pre-determined amount of time unless an indication is received by the resource distribution authentication system—such as from the first user account and/or the second user account—that the trusted third party distribution should not occur.

FIG. 6 illustrates a process flow 600 for generating an expected input resource performance interface component to configure a graphical user interface of a user device, in accordance with an embodiment of the invention. In some embodiments, a system (e.g., similar to one or more of the systems described herein with respect to FIGS. 1A-1C) may perform one or more of the steps of process flow 600. For example, a resource distribution authentication system (e.g., the system 130 described herein with respect to FIG. 1A-1C) may perform the steps of process 600.

As shown in block 602, the process flow 600 may include the step of receiving a plurality of first user account indicators, the plurality of first user account indicators comprising at least one of an expected resource input distribution or a plurality of expected resource allocations to a plurality of associations. By way of non-limiting example, the resource distribution authentication system may receive a plurality of first user account indicators from a first user account associated with a tracked resource input distribution. In some embodiments, each of these first user account indicators may be filled out by a first user of the first user account by interacting with a graphical user interface that is configured by an interface component generated by the resource distribution authentication system, where the interface component may be generated to request information regarding the first user and the first user's expected resource input distribution(s).

For example, such a plurality of first user account indicators may comprise data regarding the expected resource input distribution(s) such as the expected amount of the resource input distribution (e.g., an expected amount of money that the first user anticipates receiving from an entity, such as an entity that hired the first user for services), a breakdown of the resource input distribution (e.g., an hourly expected amount of resources, such as an hourly wage and/or a salary for the first user), and/or the like.

In some embodiments, the first user account indicators may comprise data regarding the expected resource input distribution(s) and/or a plurality of expected resource allocations to a plurality of associations. In some embodiments, the plurality of expected resource allocations to a plurality of associations may comprise data regarding resource distributions that are automatically removed from the resource input distribution before the resource input distribution is transmitted to the first user account. For instance, the expected resource allocations may be transmitted to a plurality of associations such as tax associations, insurance associations, social security associations, retirement associations/accounts, and/or the like, such that each of the plurality of expected resource allocations may comprise at least one of a federal tax, state tax, social security, insurance policies, retirement savings, and/or the like.

As shown in block 604, the process flow 600 may include the step of generating an expected input resource performance based on the plurality of first account indicators. By way of non-limiting example, the resource distribution authentication system may generate an expected input resource performance based on taking the resource input distribution tracked by the resource distribution authentication system and comparing the resource input distribution against at least one of the expected input resource distribution or a plurality of expected resource allocations. For instance, and where the resource input distribution tracked by the resource distribution authentication system comprises a lower amount than the expected resource input distribution (e.g., where the actual amount received as a paycheck is lower than the expected paycheck to the first user account), the resource distribution authentication system may determine based on the plurality of expected resource allocations (e.g., expected withholdings to the expected resource input distribution), whether the tracked resource input distribution is of the right amount, based on an expected input resource performance.

By way of non-limiting example, the resource distribution authentication system may determine the expected input resource performance based on the input resource distribution and the plurality of first account indicators, which may be used by the resource distribution authentication system to determine the likely expected input resource performance that the first user likely worked. For instance, the resource distribution authentication system may analyze the plurality of first account indicators to determine a likely amount of withholdings for the input resource distribution, and based on the input resource distribution tracked (e.g., the actual amount received by the first user account), against the expected resource allocations (e.g., the expected withholdings) and the expected resource input distribution (e.g., the expected resource distribution the first account should have received based on the withholdings), the resource distribution authentication system may determine the likely amount of hours the first user worked and/or the likely amount of other withholdings taken from the resource input distribution. Such other withholdings may comprise withholdings regarding pre-tax withholdings such as food paid for out of the resource input distribution, parking paid for out of the resource input distribution, and/or the like. In this manner, the resource distribution authentication system may indicate to the first user where each withholding of the resource input distribution was allocated to (e.g., where each withholding was transmitted to and to what association), may indicate how many hours the resource distribution authentication system determined the first user likely worked based on the withholdings and the resource input distribution tracked, and/or the like.

As shown in block 606, the process flow 600 may include the step of generating an expected input resource performance interface component to configure a graphical user interface of the device associated with the first user account, the expected input resource performance interface component comprising the expected input resource performance. By way of non-limiting example, the resource distribution authentication system may generate the expected input resource performance interface component to configure a graphical user interface of the user device associated the first user account to indicate the expected input resource performance that was generated in block 604. In some embodiments, the expected input resource performance interface component may configure the graphical user interface of the user device to show a visual/graphic of the expected performance of the first user based on the data received and generated in blocks 602-604, where the visual/graphic may indicate the number of hours the resource distribution authentication system calculated the first user likely worked for the resource input distribution tracked.

By way of non-limiting example, the first user may use the expected input resource performance interface component to determine if the first user received the correct resource input distribution. In some embodiments, and where the first user has determined that the first user did not receive the right resource input distribution, the first user may use the expected input performance interface component and its data to show the source entity a correct resource input distribution which should be distributed to the first user account.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for tracking, authenticating, and generating resource distributions to trusted third parties, the system comprising:
    a memory device with computer-readable program code stored thereon;
    at least one processing device operatively coupled to the at least one memory device operatively coupled to the at least one memory device and at least one communication device, wherein executing the computer-readable code is configured to cause the at least one processing device to:
        track a resource input distribution to a first user account;
        receive a third party distribution request from the first user account, the third party distribution request comprising at least a portion of the resource input distribution;
        identify a plurality of categories for the trusted third party distribution set, the plurality of categories comprising at least one of a type of entity, a type of entity function, or a type of geolocation;
        generate a potential third party distribution set, the potential third party distribution set comprising a plurality of potential third parties;
        transmit the potential third party distribution set to a second user account;
        receive a plurality of accepted third parties from the second user account;
        update the trusted third party distribution set with the plurality of accepted third parties; and
        authenticate a third party associated with the third party distribution request, the authentication of the third party comprising a comparison of the third party against a trusted third party distribution set,
        wherein, in an instance where the third party matches at least one trusted third party of the trusted third party distribution set, allow a third party distribution associated with the third party distribution request.

2. The system of claim 1, wherein the computer-readable program code is further configured to cause the at least one processing device to:
    authenticate the third party associated with the third party distribution request, the authentication of the third party comprising a comparison of the third party against a trusted third party distribution set,
    wherein, in an instance where the third party does not match at least one third party of the trusted third party distribution set, deny the third party distribution request.

3. The system of claim 1, wherein the trusted third party distribution set is determined by a second user associated with the second user account, the second user account comprising a plurality of privilege identifiers, wherein the plurality of privilege identifiers comprises a first user account identifier.

4. The system of claim 3, wherein the plurality of privilege identifiers comprises an allowance of the second user account to identify a plurality of trusted third parties associated with the trusted third party distribution set.

5. The system of claim 1, wherein the computer-readable program code is further configured to cause the at least one processing device to:
    receive an indication of the resource input distribution to the first user account;
    determine, in response to receiving the indication of the resource input distribution, a trusted third party distribution from the trusted third party distribution set; and
    automatically distribute the trusted third party distribution to a trusted third party associated with the trusted third party distribution.

6. The system of claim 5, wherein the trusted third party distribution comprises a pre-determined portion of the resource input distribution.

7. The system of claim 1, wherein the computer-readable program code is further configured to cause the at least one processing device to:
generate a third party distribution interface component to configure a graphical user interface of a device associated with the first user account, the third party distribution interface component comprising data of the third party distribution request.

8. The system of claim 7, wherein the computer-readable program code is further configured to cause the at least one processing device to:
generate a graphic third party distribution interface component to configure the graphical user interface of the device associated with the first user account, the graphic third party distribution interface component comprising at least one of data associated with the third party of the third party distribution, a function of the third party distribution, or an illustrative function of the third party distribution.

9. The system of claim 1, wherein the tracking of the resource input distribution comprises the computer-readable program code being further configured to cause the at least one processing device to:
receive a plurality of first user account indicators, the plurality of first user account indicators comprising at least one of an expected resource input distribution or a plurality of expected resource allocations to a plurality of associations;
generate an expected input resource performance based on the plurality of first account indicators; and
generate an expected input resource performance interface component to configure a graphical user interface of the device associated with the first user account, the expected input resource performance interface component comprising the expected input resource performance.

10. A computer-program product for tracking, authenticating, and generating resource distributions to trusted third parties, wherein the computer program product comprises at least one non-transitory computer-readable medium having computer-readable program code portions embodied therein, the computer-readable program code portions which when executed by a processing device are configured to cause the processing device to:
track a resource input distribution to a first user account;
receive a third party distribution request from the first user account, the third party distribution request comprising at least a portion of the resource input distribution;
identify a plurality of categories for the trusted third party distribution set, the plurality of categories comprising at least one of a type of entity, a type of entity function, or a type of geolocation;
generate a potential third party distribution set, the potential third party distribution set comprising a plurality of potential third parties;
transmit the potential third party distribution set to a second user account;
receive a plurality of accepted third parties from the second user account;
update the trusted third party distribution set with the plurality of accepted third parties;
authenticate a third party associated with the third party distribution request, the authentication of the third party comprising a comparison of the third party against a trusted third party distribution set,
wherein, in an instance where the third party matches at least one trusted third party of the trusted third party distribution set, allow a third party distribution associated with the third party distribution request; and
automatically update a third party distribution tracking database associated with the first user account with the third party distribution request.

11. The computer program product of claim 10, wherein the computer-readable program code is further configured to cause the at least one processing device to:
authenticate a third party associated with the third party distribution request, the authentication of the third party comprising a comparison of the third party against a trusted third party distribution set,
wherein, in an instance where the third party does not match at least one third party of the trusted third party distribution set, deny the third party distribution associated with the third party distribution request.

12. The computer program product of claim 10, wherein the trusted third party distribution set is determined by a second user associated with the second user account, the second user account comprising a plurality of privilege identifiers, wherein the plurality of privilege identifiers comprises a first user account identifier.

13. The computer program product of claim 12, wherein the plurality of privilege identifiers comprises an allowance of the second user account to identify a plurality of trusted third parties associated with the trusted third party distribution set.

14. The computer program product of claim 10, wherein the computer-readable program code is further configured to cause the at least one processing device to:
receive an indication of the resource input distribution to the first user account;
determine, in response to receiving the indication of the resource input distribution, a trusted third party distribution from the trusted third party distribution set; and
automatically distribute the trusted third party distribution to a trusted third party associated with the trusted third party distribution.

15. The computer program product of claim 14, wherein the trusted third party distribution comprises a pre-determined portion of the resource input distribution.

16. The computer program product of claim 10, wherein the computer-readable program code is further configured to cause the at least one processing device to:
generate a third party distribution interface component to configure a graphical user interface of a device associated with the first user account, the third party distribution interface component comprising data of the third party distribution.

17. The computer program product of claim 10, wherein the tracking of the resource input distribution comprises the computer-readable program code being further configured to cause the at least one processing device to:
receiving a plurality of first user account indicators, the plurality of first user account indicators comprising at least one of an expected resource input distribution or a plurality of expected resource allocations to a plurality of associations;
generate an expected input resource performance based on the plurality of first account indicators; and
generate an expected input resource performance interface component to configure a graphical user interface of the device associated with the first user account, the expected input resource performance interface component comprising the expected input resource performance.

18. A computer-implemented method for tracking, authenticating, and generating resource distributions to trusted third parties, the computer-implemented method comprising:

tracking a resource input distribution to a first user account;

receiving a third party distribution request from the first user account, the third party distribution request comprising at least a portion of the resource input distribution;

identify a plurality of categories for the trusted third party distribution set, the plurality of categories comprising at least one of a type of entity, a type of entity function, or a type of geolocation;

generate a potential third party distribution set, the potential third party distribution set comprising a plurality of potential third parties;

transmit the potential third party distribution set to a second user account;

receive a plurality of accepted third parties from the second user account;

update the trusted third party distribution set with the plurality of accepted third parties; and authenticating a third party associated with the third party distribution request, the authentication of the third party comprising a comparison of the third party against a trusted third party distribution set, wherein, in an instance where the third party matches at least one trusted third party of the trusted third party distribution set, allowing a third party distribution associated with the third party distribution request; and automatically updating a third party distribution tracking database associated with the first user account with the third party distribution request.

* * * * *